United States Patent [19]

Teissier

[11] 4,059,360
[45] Nov. 22, 1977

[54] DEVICE FOR MECHANICAL CONNECTION

[75] Inventor: Etienne Leon Norbert Teissier, Cogolin, France

[73] Assignee: Etat Francais Représenté par de Délégue Ministériel pour l'Armement, Paris, France

[21] Appl. No.: 708,318

[22] Filed: July 26, 1976

[51] Int. Cl.² ............................................. F16B 2/02
[52] U.S. Cl. ........................................ 403/2; 403/141; 403/143; 403/165; 403/312
[58] Field of Search .............. 403/90, 76, 141, 133, 403/142, 143, 310, 311, 312, 313, 305, 309, 165, 2, 223, 289, 301, 302, 122, 114, 115; 74/584, 581

[56] References Cited

U.S. PATENT DOCUMENTS

| 2,825,268 | 3/1958 | Mambro et al. | 403/141 X |
| 2,855,090 | 10/1958 | Zebley | 403/312 X |
| 3,544,259 | 12/1970 | Fujita | 403/122 X |
| 3,962,575 | 6/1976 | Vandenberg | 403/90 X |

FOREIGN PATENT DOCUMENTS 750,052  6/1956  United Kingdom ................ 403/305

Primary Examiner—Andrew V. Kundrat
Attorney, Agent, or Firm—Larson, Taylor & Hinds

[57] ABSTRACT

A reusable device is presented for effecting a mechanical connection between two elements that are substantially coaxial, the elements subject to traction stresses with reference to each other, and the elements disconnectable beyond a specific traction threshold. The device includes a casing, with a first half and a second half, integrally connected to one of the elements, the casing having a cavity formed between said halves, and said casing comprising elastic material. The other element includes a bulge comprising, for example, a spherical swivel joint that is received in the cavity, the portion of said halves adjacent said cavity separable as the bulge passes into the cavity.

4 Claims, 3 Drawing Figures

DEVICE FOR MECHANICAL CONNECTION

BACKGROUND OF THE INVENTION

1. Field of the Invention

This invention relates to devices for mechanical connection, and particularly to devices for connecting elements subjected to traction stresses, so that the elements can be disconnected if the stresses exceed a certain threshold.

2. Description of the Prior Art

Cast-off systems with screws or pins that break under a specific force are known. The value of the disengaging stress of such devices is a function of the resistance of the screw or pin to be sheared. The drawbacks of these devices are due in the main to the fact that it is not possible with great precision to reproduce the screw or pin. Further, it is only possible to work with stresses that are less than the disengaging force since once tested with a disengaging force, the devices are not reuseable. Thus, the disengagement force corresponding to each device is only known with a considerable amount of uncertainty, since one the force is measured for a particular device, it is not possible to make a new device having the same characteristics as the former one.

SUMMARY OF THE INVENTION

The invention is intended to remedy drawbacks of the prior art devices which include lack of reproducibility, non-reutilization after disengagement, and impossiblity of testing at the disengagement force.

To attain this objective, the invention includes a device that has a male piece including a bulge secured to the end of a first element, and a casing that is integral with the end of a second element. The casing includes a cavity comprised of an elastic material. The bulge is removably received in the cavity, the cavity adapting itself substantially to the configuration of the bulge that is received therein.

The bulge is preferably formed by a portion of a spherical joint, and the casing includes a first half and a second half, comprised of elastic material, and assembled along a joint plane parallel to the common axis of the elements that are connected by the device.

The result of the invention is a novel product including a mechanical connecting device for connecting elements. The invention finds one of its applications in cast-off operations.

The invention affords the following advantages. The device, after disengagement, is unbroken and can be reused. Consequently, it can be tested as many times as desired. Thus, the disconnecting force is known precisely. Further, it is easy to reproduce the device, as well as its characteristics which include more particularly the force of disengagement which is a function of the dimensions of the casing. Thus, there are afforded the advantages, in manufacture, of knowing this force without having to test each device.

Another advantage is the total freedom of mutual rotation of the elements with reference to the casing. Still another advantage is a disalignment tolerance of ± 10° between the axes of the elements.

Additional features and advantage of the invention will be set forth in, or apparent from, the detailed description of the preferred embodiment of the invention found hereinbelow.

DESCRIPTION OF THE PREFERRED EMBODIMENT

Figure 2:
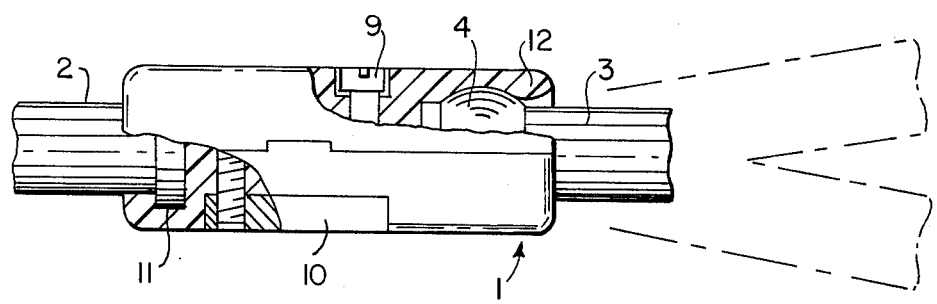
FIG. 2 is a side view of the device of FIG. 1 with partial sections at the two ends of the casing, the two elements being joined.

With reference to the said figures, there is shown a device for connecting first and second elements 2 and 3, respectively. These elements can include, for example, cables, this example being cited as a non-limiting one, that are subject to traction with reference to each other. So long as the stress is below a certain threshold, denoted F, that can suitably be designated as a "disengagement force", the device holds the elements interconnected. When the stress becomes greater than the disengagement force F, the first and second elements are separated. This separation is necessary in cast-off operations. The connection, as depicted in FIG. 2, is effected in the following way. At the end of the second element 3, there is fixed a male piece 4 comprising a bulge. In the preferred embodiment, the bulge can include a spherical swivel joint.

A casing 1 is integral with the end of the first element 2 which includes a collar 11 encased in said casing 1, so as not to be disengaged from casing 1 when a disengagement force F is applied to disengage element 3 from casing 1. Casing 1 further has at the opposite end from that which receives element 2, a cavity 5 of elastic material that substantially adapts itself to the form of bulge 4 encased in cavity 5. The automatic disengagement of the device without breaking is effected because of the construction of casing 1 associated with the configuration of the male piece 4 and the cavity 5.

The casing includes a first half 6 and a second half 7, assembled along a joint plane parallel to axis 8 which is common to the said elements.

These two halves are secured together at the central part of the casing by any means known to the specialist, including, for example, by screws 9. Screws 9 pass through the central part of the casing, the end of screws 9 being secured into a metal plate 10 so as to hold the central portion of halve 6 in contact with the central portion of halve 7. The said central part of casing 1, to effect the object of the invention, must be located outside cavity 5 so as to allow free deformation of the cavity in disengagement.

In a preferred embodiment, Ertalon 6 × AU was utilized as a plastic material, and stainless steel or brass was utilized for the connecting screws 9, the male piece 4, and the element 2. The disengagement force F was then tested at 160 ± 5 da N for the force at which the casing disconnects.

Figure 1:
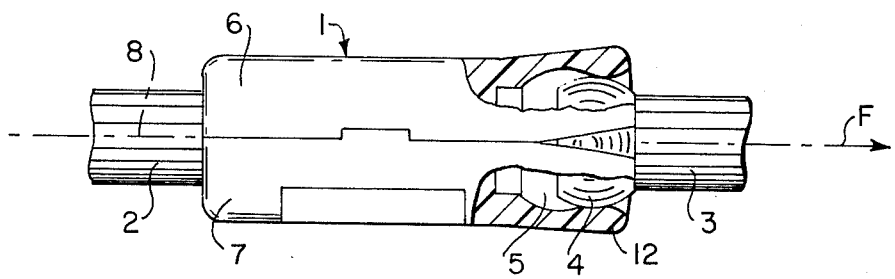
FIG. 1 is a side view of the device for connecting elements, at the time of disengagement of one element, with a partial section at one end of the casing.

Only the end of the casing forming cavity 5 has halves 6 and 7 free to separate from each other, to allow disengagement. This is illustrated more particularly in FIG. 1 where the ends of halves 6 and 7 of casing 1, and that define cavity 5, are separated under the effect of a force F indicated by the arrow, which tends to release male piece 4 from the casing. For a release to be effected, the resistance presented by constriction 12 of cavity 5, constriction 12 including an orifice which has an internal diameter less than the maximum diameter of piece 4, has to be overcome.

Once disengagement is effected, the elastic material of the casing resumes its original form without damage and may be used again. Due to the cylindrical nature of collar 11 on the one hand and the configuration of the portion of the spherical swivel joint or male piece 4, on the other hand, the embodiment further allows a freedom of rotation of elements 2 and 3 with reference to casing 1, about their axis of joining.

Figure 3:
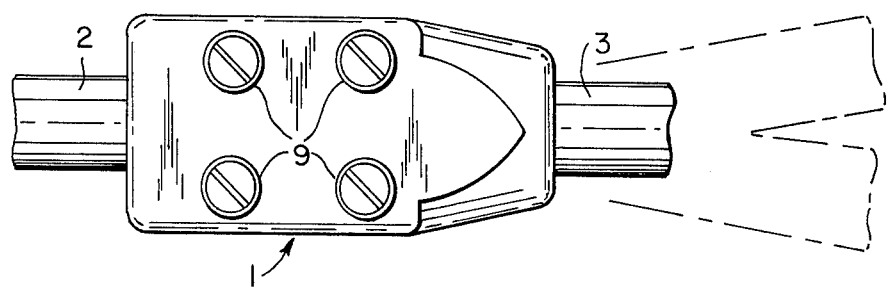
FIG. 3 is a top view of the device of FIG. 1.

Another advantage is indicated in dotted lines in FIGS. 2 and 3. This refers to the disalignment tolerated by the axes of the two elements 2 and 3. The tolerance ranges between ± 10°.

FIG. 3 shows the particular form selected as an example of the preferred embodiment, said preferred embodiment is not limiting. Casing 1 has the form of a cylinder extended by a truncated cone at the end which encloses cavity 5, and cut by two parallel planes, the lower face of plate 10 belonging to one of these planes and the ends of the heads of screws 9 to the other plane.

Although the present invention has been described relative to an exemplary embodiment thereof, it will be understood by those skilled in the art that variations and modifications can be effected in these embodiments without departing from the scope and spirit of the invention.

I claim:

1. A device for providing mechanical connection between a first and a second substantially coaxial element that are mutually subject to traction, said device disconnectable beyond a specific traction threshold and reusable, comprising a male piece fixed to the end of the first element, so as to form a bulge at the end of the first element, and a casing integral with the end of the second element, said casing comprised of elastic material and including a cavity that substantially adapts to the form of said bulge removably received in said cavity, said casing includes a first half and a second half, said halves assembled along a joint plane parallel to an axis that is common to the elements, each of said halves have a central part and including means for securing the central part of said first half to the central part of said second half, and wherein said securing means includes at least one screw, and wherein said casing includes a metallic platelet in which the end of said screw is secured; and wherein said cavity is located outside central part, said cavity defined by adjacent ends of said halves, said ends separable from each other, and said central part being connected to the end of the second element.

2. A device in accordance with claim 1 wherein said bulge includes a portion of a spherical swivel joint.

3. A device in accordance with claim 1 wherein said second element includes an end having a collar that is encased in said casing, so that the second element is integral in translation with the casing, said second element swivelable in said casing.

4. A device in accordance with claim 1 wherein said casing includes an entrance orifice communicating with said cavity, and wherein said bulge includes a spherical swivel joint, said orifice having an internal diameter that is less than the maximum diameter of said bulge.

* * * * *